United States Patent
Fünfschilling et al.

(10) Patent No.: US 7,126,654 B2
(45) Date of Patent: Oct. 24, 2006

(54) SWITCHABLE COLOR FILTER

(75) Inventors: Jürg Fünfschilling, Basel (CH); Klaus Schmitt, Lörrach (DE); Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 10/415,713

(22) PCT Filed: Nov. 1, 2001

(86) PCT No.: PCT/CH01/00646

§ 371 (c)(1),
(2), (4) Date: Aug. 21, 2003

(87) PCT Pub. No.: WO02/37176

PCT Pub. Date: May 10, 2002

(65) Prior Publication Data

US 2005/0099373 A1    May 12, 2005

(30) Foreign Application Priority Data

Nov. 3, 2000    (EP) .................. 00811032

(51) Int. Cl.
*G02F 1/1347* (2006.01)

(52) U.S. Cl. ................ 349/80; 349/77; 349/78; 349/74

(58) Field of Classification Search ......... 349/80, 349/81
See application file for complete search history.

(56) References Cited

U.S. PATENT DOCUMENTS

| | | | |
|---|---|---|---|
| 5,235,443 A | 8/1993 | Barnik et al. | |
| 5,325,218 A * | 6/1994 | Willett et al. | 349/74 |
| 5,389,698 A | 2/1995 | Chigrinov et al. | |
| 5,602,661 A | 2/1997 | Schadt et al. | |
| 5,686,931 A | 11/1997 | Fünfschilling et al. | |
| 5,838,407 A | 11/1998 | Chigrinov et al. | |
| 6,046,790 A * | 4/2000 | Hara et al. | 349/172 |

FOREIGN PATENT DOCUMENTS

| | | |
|---|---|---|
| EP | 0 689 084 A1 | 12/1995 |
| EP | 0 713 126 A1 | 5/1996 |
| EP | 0 756 193 A1 | 1/1997 |
| WO | WO 95/34022 A1 | 12/1995 |
| WO | WO 99/49360 A1 | 9/1999 |
| WO | WO 99/64924 A1 | 12/1999 |
| WO | WO 00/36463 A1 | 6/2000 |

* cited by examiner

*Primary Examiner*—Andrew Schechter
*Assistant Examiner*—Richard Kim
(74) *Attorney, Agent, or Firm*—Sughrue Mion, PLLC

(57) ABSTRACT

A liquid crystal switchable color filter switches between three color bands and is preferably used for time-sequential devices, such as projection devices, direct view displays and video cameras. The color filter may employ circularly polarizing selective reflection bands of at least four cholesteric filters together with three liquid crystal switches and related retarder layers. In one embodiment, the handedness of the second cholesteric is equal to the handedness of the third cholesteric filter and opposite to the handedness of the first and fourth cholesteric filter and, for the blocking state of a color band, the optic axis of the corresponding liquid crystal switch is parallel or perpendicular to the polarization direction. This concept leads to improved, excellent color saturation and requires less stringent production tolerances than in the prior art. Moreover, it advantageously allows overlapping color transmission bands thus improving the light efficiency.

17 Claims, 13 Drawing Sheets

SWITCHABLE COLOR FILTER

This application is a national stage filing under 35 U.S.C. § 371 of International Application No. PCT/CH/0100646, filed Nov. 1, 2001, which published in the English language. This application also claims the benefit of priority under 35 U.S.C. § 119(a) to EP 00811032.2, filed on Nov. 3, 2000.

The present invention relates to a liquid crystal switchable color filter and, in particular, to such a color filter that employs circularly polarizing selective reflection bands of cholesteric filters; and to time-sequential color devices, for example projection devices, direct view displays and video cameras, comprising said color filter.

Fast switching color filters which provide the primary colors RGB (Rad-Green-Blue) synchronized with a fast imager represent the central unit of time sequential single panel video projectors. This projector type is of particular interest because of its compactness, low cost, and low weight. While the color filters generate the three color components of the full-color picture, the imager determines the gray levels of these components. If the switching frequency is sufficiently high the human eye simply integrates over the three color components and generates the intended mixed color. Analogously, time sequential direct view displays are possible, and there exist also color video cameras based on the time sequential technique. The latter generate three gray scale images of the three color components which can be back transformed to the color image by calculating the mixed color component or by time sequential projection.

Various designs of color switches have been proposed. One well-known solution for RGB color generation is the mechanical color wheel. Its main drawbacks are light induced degradation of the color filters used, large volume of the device, and jitter due to mechanical instabilities.

Another known solution are stacked retarder/polarizer combinations with liquid crystal switches, where unwanted color components are removed (absorbed) by the polarizer. However, these filters are difficult to produce. In particular, it is difficult to generate saturated colors with thin stacked retarders, and furthermore absorbing polarizers tend to degrade under high light levels.

A third known solution uses stacked cholesteric filters, combined with liquid crystal switches. Instead of being absorbed, the unwanted color component is reflected by the cholesteric filters. This alternative is particularly attractive because the high light level present in projectors tends to damage any absorbing component. Furthermore, cholesteric filters exhibit steep selective reflection bands which result in excellent color saturation. In addition, they generate circularly polarized light within the reflection band of the filter in accordance with its cholesteric helical structure which can be easily transformed to linear polarized light without loss of intensity. Cholesteric filters are nematic liquid crystals with a helical structure with a pitch that is comparable to the wavelength of light. If crosslinkable nematic liquid crystals are used, the filters can be produced as thin films that can easily be combined with nonchiral retarders to form a complex stack structure.

Subtractive color switches and modulators based on cholesteric filters and liquid crystal switches are known and for instance described in the following publications: U.S. Pat. No. 5,686,931 (Fünfschilling et al.); J. Fünfschilling and M. Schadt, Novel LCD Color Projectors Based on Cholesteric Filters, SID International Symposium, Digest of Technical Papers, XXVI, 597–600 (1995); and K. Schmitt, J. Fünfschilling, M. Z. Cherkaoui and M. Schadt, Fast Time-Sequential Color Switch Based on Cholesteric Filters and DHF-LCDs, EuroDisplay '99: The 19th International Display Research Conference, Proceedings, 437–440 (1999).

For comparison purposes, the general structure of a known color switch is also illustrated in FIG. 1, and a schematic representation of a corresponding known band modulation filter is depicted in FIG. 3. The color switch consists of three stacked band modulation filters (BMFs) 1, 3, and 5, each capable of blocking one of the primary colors R, G or B by applying suitable voltages to the electrodes of the liquid crystal switches which are part of each band modulation filter. The filters are independent from each other in the sense that each filter controls a well defined wavelength band. At each switching state of the time sequential color switch, two color bands are blocked and one passes.

Independent BMFs in series are an optical concept which leads to highly saturated colors. It can be implemented with fast LCDs, such as ferroelectric LCDs. Used on a pixel-to-pixel basis, it can also be used to generate true color projection systems.

Despite these advantages, the known cholesteric color switches with their concept of independent BMFs in series still have shortcomings. One is that the realization poses stringent production tolerances on the LCDs.

Another, conceptual shortcoming is that they represent not the most efficient way to split white light into saturated primary colors. The reason for this is a peculiarity of the human color perception: If one determines the brightest band-pass filters that produce a given color saturation, one gets filter bands that overlap unless the color saturation is extremely high. As an example, the ideal band-pass-filters to produce NTSC color coordinates from a white light source have transmission bands from 400 . . . 509 nm (B), 497 . . . 566 nm (G) and 588 . . . 700 nm (R), respectively. There is a considerable overlap (497 . . . 509 nm) of the blue and the green filter.

However, the requirement for the independent BMFs that at each switching state two color bands are blocked and one passes implies that the blocking bands of two adjacent colors must overlap. During the red period, for instance, no 'gap' is allowed between the green and the blue filter, or—in other words—the respective filter transmission bands may not overlap. Compared with the ideal case, therefore, half of the light in this wavelength region is lost by the requirement of non-overlapping filter transmission bands. For real filters with their finite steepness of the filter characteristics the light loss is even significantly higher.

A further shortcoming of the known cholesteric color switches can best be explained with reference to FIG. 3, which gives a schematic representation of a conventional BMF. It comprises two cholesteric filters 13 and 15, which have an opposite handedness of the cholesteric helix, but are otherwise identical. Sandwiched between the cholesteric filters are two quarter wave plates ($\lambda$/4-plates) 17 and 19, and an LC switch 21. The LC switch acts as a rotatable halve-wave plate ($\lambda$/2-plate). The upper part of the Fig. shows the blocking state of the BMF. An important feature of this optical arrangement is, that the effective birefringence of the combination '$\lambda$/4-plate/LC switch/$\lambda$/4-plate' is zero in the blocking state of the BMF. In this state, the two other colors should pass unaltered, which is indeed true if the total birefringence is zero. Note that a change of polarization finally results in a reduced filter transmission. The precise degree of compensation to zero birefringence is not very critical in this respect. However, any residual birefringence changes the blocking power of the filter, leading to reduced color saturation. This imposes stringent tolerances for the optical retardation $\Delta$nd of the LC switch cell ($\Delta$n is the birefringence of the LC material, d the cell gap). In addition, some ferroelectric LC switch cells (e.g. DHF LC cells) have intrinsic variations of Δn that lead to significant (3 . . . 5%) residual transmission of the BMF in its blocking state.

It is therefore an object of the invention to provide a switchable color filter, which overcomes the above mentioned shortcomings.

This invention provides a liquid crystal switchable color filter for switching between a first, a second and a third color band, which switchable color filter comprises a first switchable liquid crystal cell, a first retarder layer which is a quarter-wave plate for the first color band, a first cholesteric filter having a selective reflection band for the first color band, a second cholesteric filter having a selective reflection band for the second color band, a second retarder layer which is a quarter-wave plate for the second color band, a second switchable liquid crystal cell, a third retarder layer which is a quarter-wave plate for the second color band, a third cholesteric filter having a selective reflection band for the second color band, a fourth cholesteric filter having a selective reflection band for the third color band, a fourth retarder layer which is a quarter-wave plate for the third color band, a third switchable liquid crystal cell, and a polarization blocking element, wherein the switchable liquid crystal cells are capable of at least two switching states, wherein the handedness of the second cholesteric filter is equal to the handedness of the third cholesteric filter and opposite to the handedness of the first and fourth cholesteric filter, and wherein for the blocking state of the respective color band the optic axis of the corresponding switchable liquid crystal cell is either substantially parallel or substantially perpendicular to the light polarization direction.

For the polarization blocking element, two preferred embodiments are provided. In one embodiment, the polarization blocking element is formed by a linear polarizer. In the other embodiment, it is formed by a (fifth) retarder layer which acts for the third color band as a quarter-wave plate and a (fifth) cholesteric filter having a selective reflection band for the third color band.

In a preferred embodiment, a supplementary cholesteric filter having a selective reflection band for the first color band and a supplementary retarder layer which is a quarter-wave plate for the first color band is added on the light input side. This embodiment is directly suitable for unpolarized input light. On the other hand, without the supplementary cholesteric filter and retarder layer, input light can be used which is already linearly polarized; this is for instance the case if a polarization recovery scheme is used to illuminate the switchable color filter. Polarization recovery schemes are known using non-absorbing polarizers that split unpolarized light into two beams of differently polarized light, and then transform the polarization of one beam into the polarization of the other and combine them to a single beam—see for example U.S. Pat. No. 5,235,443.

Further embodiments make use of the advantageous feature of the invention to allow cholesteric filters with overlapping wavelength bands. Preferably, the short-wavelength cutoff of the second cholesteric filter is different from the short-wavelength cutoff of the third cholesteric filter. Advantageously, the long-wavelength cutoff of the first cholesteric filter and the short-wavelength cutoff of the third cholesteric filter are at a substantially equal wavelength, which is shorter than the short-wavelength cutoff of the second cholesteric filter. Preferably, the long-wavelength cutoff of the second cholesteric filter is different from the long-wavelength cutoff of the third cholesteric filter. Advantageously, the long-wavelength cutoff of the third cholesteric filter is at a longer wavelength than the short-wavelength cutoff of the fourth cholesteric filter.

The liquid crystal switchable cells act as a rotatable halve-wave plate. Many liquid crystal devices are capable of performing this optical function, in particular DHF-, SSF-, anti-ferroelectric, thresholdless anti-ferroelectric or electroclinic LC cells.

The invention is particularly suitable for a time-sequential color device; it may, however, also be useful as a switchable color filter for other applications.

A liquid crystal switchable color filter according to the invention can be used in projection optics and in direct view optics. A further application is in color video cameras based on the time sequential technique.

The invention solves the problems of the prior art devices described at the beginning and moreover does not unfavorably influence other important parameters such as high brightness.

With a liquid crystal switchable color filter according to the invention, the dependence of the contrast on Δnd-variations advantageously is greatly reduced. This can for instance be understood by comparing FIG. 3, schematically representing a prior art BMF configuration, and FIG. 4, representing a 'cholesteric filter/λ/4-plate/LC switch/λ/4-plate/cholesteric filter' configuration according to the invention, and observing the polarization of light within the selective wavelength range as it passes through the configurations. The unpolarized input light is circularly polarized by the first cholesteric filter 13, only right (R-) circularly polarized light passes this filter. The first λ/4-plate 17 transforms this light into linearly (p-) polarized light. Depending on the switching state of the LC switch 21, the plane of linear polarization is rotated by 90° (top) or remains unchanged (bottom). The second λ/4-wave plate 19 transforms this light into R-(top) or L-(bottom) circularly polarized light. In the version of the prior art (FIG. 3) the exit cholesteric filter 15 reflects R-polarized light, i.e. the upper case is the blocking, the lower case the transmitting configuration. By contrast, in the new version proposed by the invention, where the two cholesteric filters have equal handedness, an exit cholesteric filter 23 blocks L-polarized light (lower case in FIG. 4) and passes R-polarized light. By observing the state of polarization at the LC switch we see that in the blocking state of the new design illustrated in FIG. 4 the linear polarization is parallel to optical axis of the LC switch, and consequently variations in Δnd have very little influence on the state of polarization of the light. In contrast, in the prior art configuration illustrated in FIG. 3 Δnd has to match exactly the birefringence of the λ/4-wave plates, imposing not only stringent production tolerances on the cell gap d, but also requires matched dispersion of the λ/4-wave plates and the liquid crystal material. The Δnd-variations are, of course, still present in a switchable color filter according to the invention, but result by analogy in a 3 . . . 5% change of (not the dark but) the bright state transmission, which is far less damaging than the corresponding increase in the blocking state.

Advantageously, with a liquid crystal switchable color filter according to the invention there are no more three independent BMFs, but a single entity that comprises retarders and liquid crystal switches in a way that cannot be described as a stack of independent BMFs, but are best regarded as 'fused' BMFs. FIG. 2 may illustrate such a concept and shows a block 7 of 'fused' BMFs in comparison to the independent BMFs 1, 3 and 5 of FIG. 1. This concept allows to freely choose the bandwidth of each dolor and to manage the otherwise critical birefringence of the BMF in its blocking state (FIG. 4 bottom). In this respect, a main point is that although light inside the selective reflection range of the filter is blocked, light outside this range should be transmitted without change of polarization. Three independent BMFs of FIG. 4 in series would result in elliptically polarized light with completely different ellipticity that cannot be compensated by simple retarders. However, the invention enables a configuration where, at least in good approximation, the birefringence of the BMF reverses the sign of circular polarization in the blocking state and leaves the polarization unchanged in the transmitting state. In the latter case the total birefringence is either zero or a full wavelength $\lambda$. In FIG. 4 the case of zero birefringence is drawn, where for the blocking state the optic axis of the LC cell is parallel to the light polarization direction. Rotating the LC cell by 90° would lead to a retardation of $\lambda$. Such a configuration, where for the blocking state the optic axis of the LC cell is perpendicular to the light polarization direction, is also a feasible.

Depending on the precise application, there may be polarizer/retarder combinations added to the light input and/or the light output side. These are indicated in FIGS. 1 and 2 as components 9 and 11. Although cholesteric color switches inherently act as polarizers, it can be preferable to use a linear pre-polarizer, and retarders may be required to match the linear polarization accordingly. Such a linear pre-polarizer is for instance desirable in case a polarization recycling scheme is used to increase the light output of the lamp. Likewise, to match the output polarization to the subsequent imager, retarders and optionally 'cleaning polarizers' may be added in order to achieve the high polarization ratios required for high quality projectors.

To adapt the characteristics of a cholesteric filter to the needs of a liquid crystal switchable color filter according to the invention, a cholesteric filter may be of a more complex type than just one layer of a cholesteric liquid crystal. For instance, it may also consist of more than one cholesteric layer, which together act as a circularly polarizing filter having a suitable reflection band, or the pitch of the cholesteric layer may vary over the layer thickness.

For the cholesteric filters preferably liquid crystal polymers and crosslinked networks respectively are used.

Advantageously, the liquid crystal elements of the color filter, that is cholesteric filters, retarders and switches, are aligned by a photo-orientation technique. Among the different known methods particularly well suited will be those using linear photopolymerisation (LLP), also sometimes referred to as photooriented polymer network (PPN). Backgrounds and manufacturing of such elements are disclosed in, for example, U.S. Pat. No. 5,389,698, U.S. Pat. No. 5,838,407, U.S. Pat. No. 5,602,661, EP-A-689084, EP-A-0756193, WO-A-99/49360, WO-A-99/64924, and WO-A-00/36463.

The invention will now be described by way of example with reference to the accompanying drawings, in which.

Figure 5A:
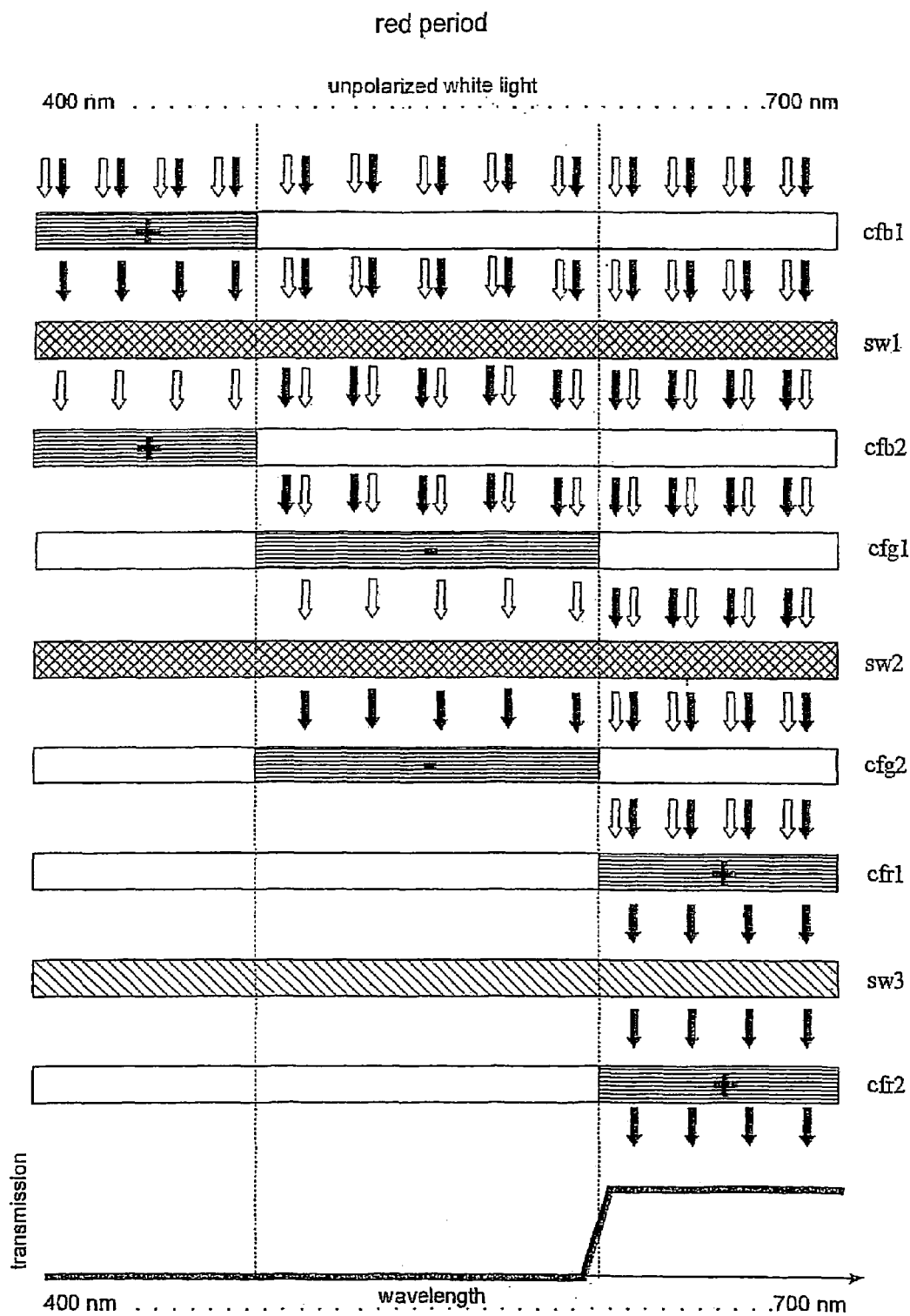
FIG. 5a to 5c are explanatory diagrams showing the basic arrangement and operation of a first embodiment of the present invention.
Figure 5B:
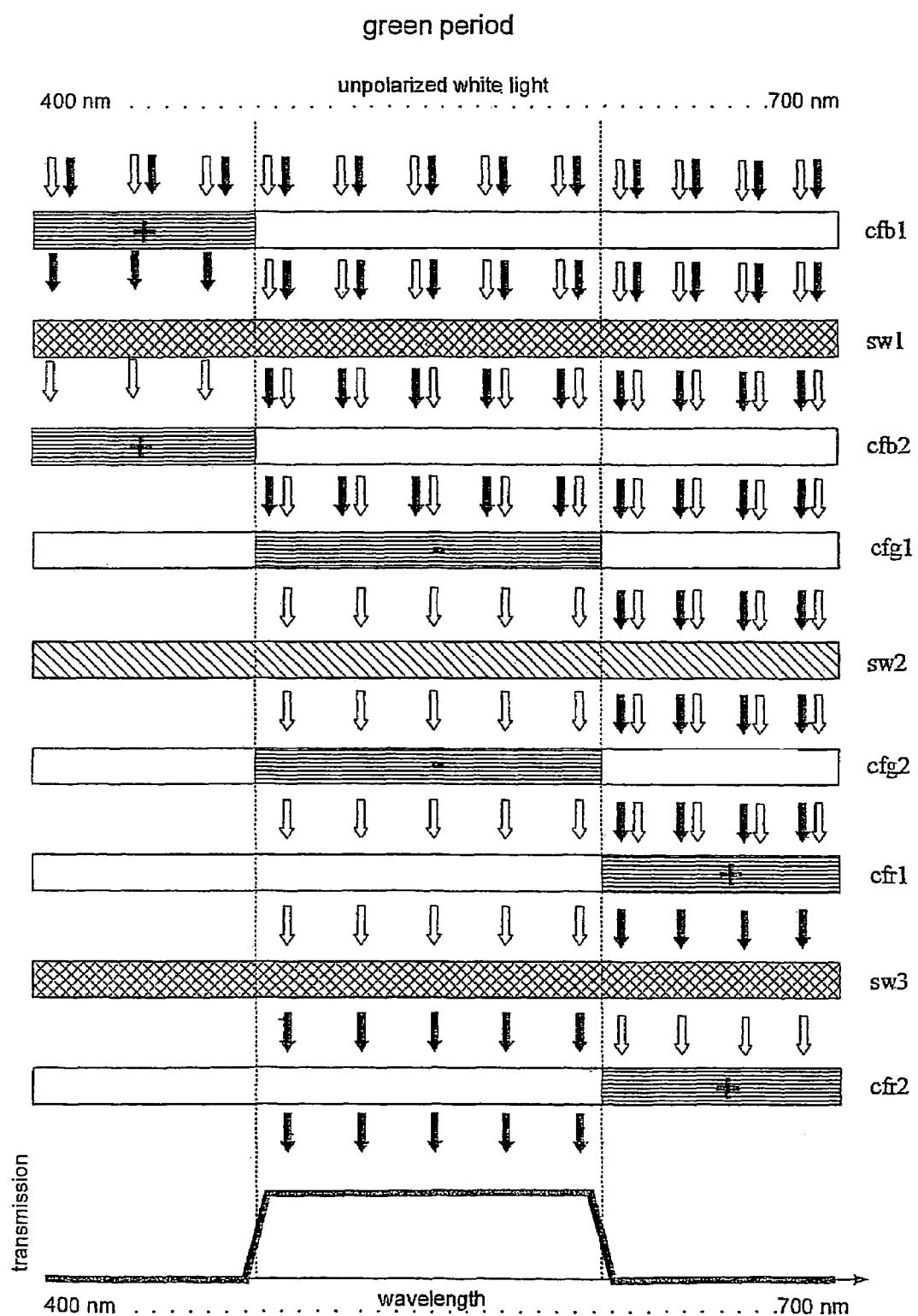
Figure 5C:
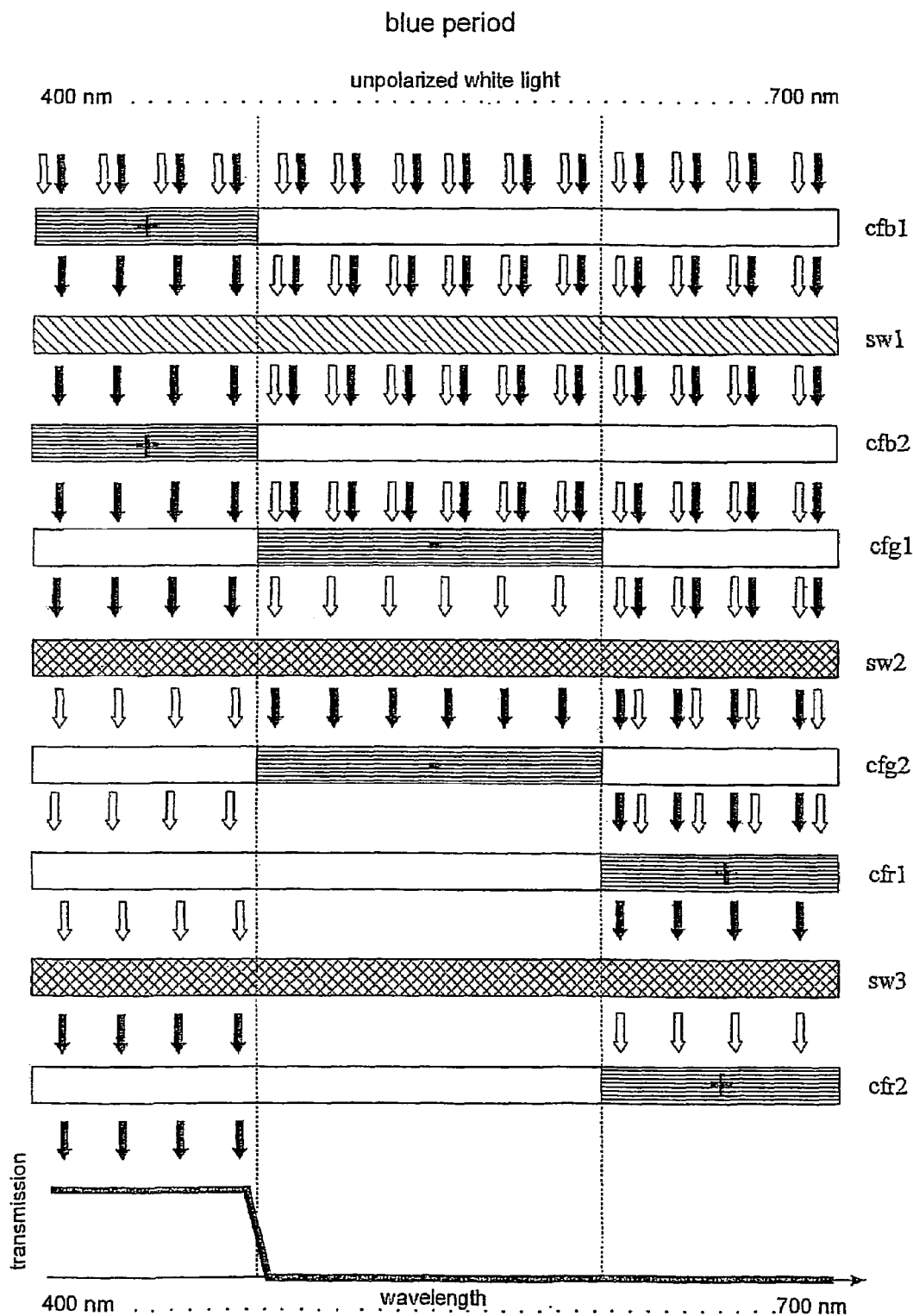

Basic arrangement and optical concept of a liquid crystal switchable color filter forming a first embodiment of the invention is schematically illustrated in FIGS. 5a, 5b and 5c. Each of the figures shows the mode of action for one of the three primary colors (RGB in this example), FIG. 5a for the red period, FIG. 5b for the green period and FIG. 5c for the blue period.

In the Fig, unpolarized light is indicated by a white/black pair of arrows, L-circularly polarized light by a single filled black arrow, R-polarized light by a single open arrow. The position of the arrows from left to right indicates its color, ranging from blue (left side) to red (right side).

The color filter comprises three times a combination '$\lambda$/4-plate/LC switch/$\lambda$/4-plate', for the sake of simplicity referred to as 'switch' and labeled sw1, sw2 and sw3, and six cholesteric filters, labeled cfb1, cfb2, cfg1, cfg2, cfr1 and cfr2. Each of the retarder/switch-combinations and each of the cholesteric filters are shown as a rectangular box extending from left to right. For each cholesteric filter, the wavelength range of selective reflection is marked within the corresponding box by a filling, and the handedness is indicated by a '+' or '−' sign.

In each of the FIGS. 5a, 5b and 5c, one of these switches is in the 'on' state (hatched filling, no change of handedness), and two in the 'blocking' state (crosshatched filling, change of handedness). The figures differ only in the color that is switched 'on'.

Let us first discuss the red period (corresponding to FIG. 5a), with the red switch sw3 'on' and the blue switch sw1 and the green switch sw2 'off'.

Unpolarized white light is impinging from the top onto the (blue) cholesteric filter cfb1.

In the blue spectral range, only L-circularly polarized light passes the filter; the R-component is reflected. Light in the green and red spectral range remains unchanged (i.e. unpolarized). Switch sw1 is in the blocking state, that is, it changes the handedness of the light. Since only the blue part of the spectrum is polarized, the change in handedness affects only the blue part of the spectrum, changing the L-polarization to the R-polarization. The next cholesteric filter cfb2, which is substantially identical to cfb1, then blocks this light. Green and red remain unpolarized.

The case of the light in the green spectral range is very similar. The light remains unpolarized until it hits the (green) cholesteric filter cfg1, where only the R-polarized light is passed (note that the handedness of the green cholesteric filters is opposite to that of the blue and the red filters, see below). Switch sw2 then reverses the polarization and the next cholesteric filter cfg2 then blocks this light.

The case of the light in the red spectral range is different. After passing the blue and green filter sections unchanged, the red light is polarized by the (red) cholesteric filter cfr1. The L-component of the red light passes and the R-component is reflected. Switch sw3 is in the 'on' state and leaves the polarization in its L-state. The light then passes the cholesteric filter cfr2, yielding red, L-polarized output light.

The green period (shown in FIG. 5b), where the green switch sw2 is 'on' and the blue switch sw1 and the red switch sw3 are 'off', is slightly more complicated.

For the blue spectral range, there is no change compared to the red period. Similarly, the red spectral range remains unpolarized until it reaches the cholesteric filter cfr1, were only the L-component passes, which is changed to the R-state by the switch sw3 and then blocked by the cholesteric filter cfr2.

The case of the green spectral range is different. After passing the blue filter section unchanged, the green light is polarized by the cholesteric filter cfg1, which passes the R-component only. The green switch in the 'on' state does not change this polarization, and the light passes as R-polarized light the next cholesteric filter cfg2. Then, the switch sw3 of the red filter section changes the polarization state of the green light at least to a first approximation) from R to L. The output is thus L-polarized, green light.

This crucial influence on the green light by the red filter section is in stark contrast to color switches of the prior art using independent band modulation filters, where the green light passes the last BMF unchanged.

It should be further noted that the choice of opposite handedness for the central (green) filter section is an important aspect of the invention, too. Choosing identical handedness would lead to colors with opposite polarizations.

Finally, FIG. 5c shows the most difficult case, namely the period of the color of the first filter section. In the present example, this is the blue period, where the blue switch sw1 is 'on' and the green switch sw2 and the red switch sw3 is 'off'.

The red spectral range is blocked as in FIG. 5b and the green spectral range is blocked as in FIG. 5a.

The blue spectral range is L-polarized by the cholesteric filter cfb1, then passes the switch sw1 and the cholesteric filters cfb2 and cfg1 with no change of polarization. Switch sw2 then approximately reverses the polarization to R, whereas switch sw3 reverses it back to L, giving L-polarized blue light output.

Again, the concept of independent band modulation filters known from the prior art does not apply since both the red and the green filter section change the polarization state of the blue spectral range.

Figure 6A:
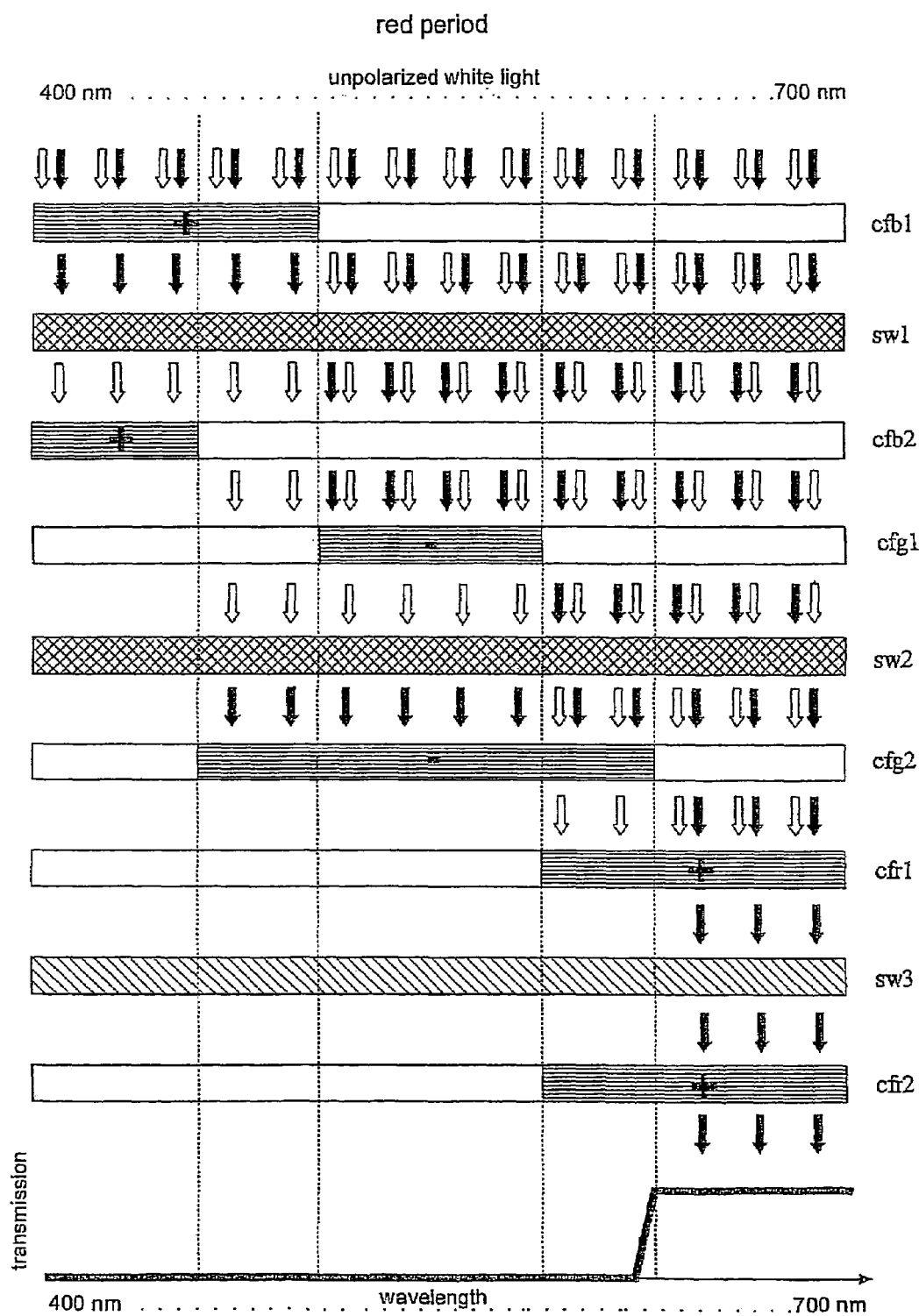
FIG. 6a to 6c are explanatory diagrams showing the basic arrangement and operation of a second embodiment of the present invention, modified as compared with FIG. 5a to 5c.
Figure 6B:
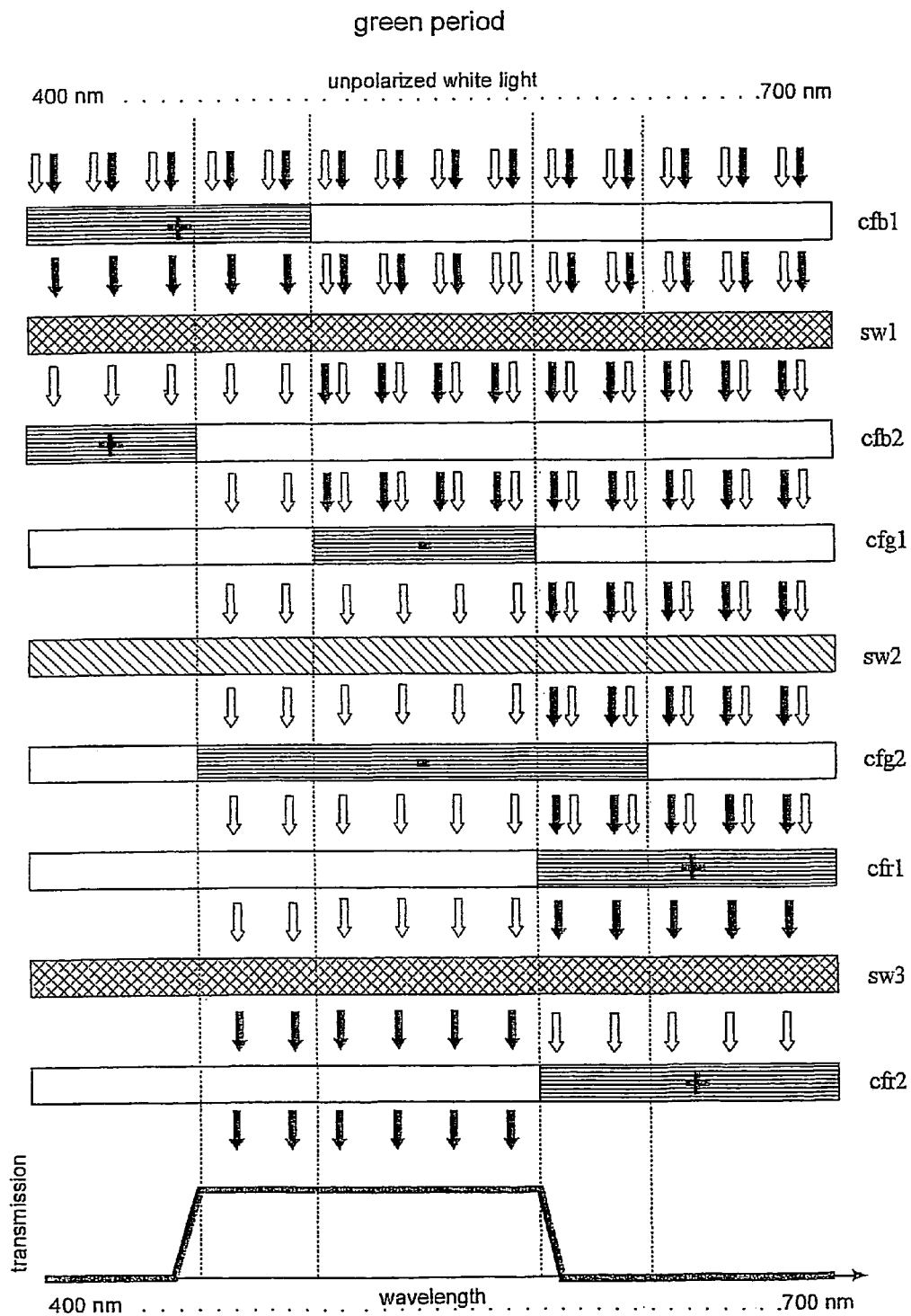
Figure 6C:
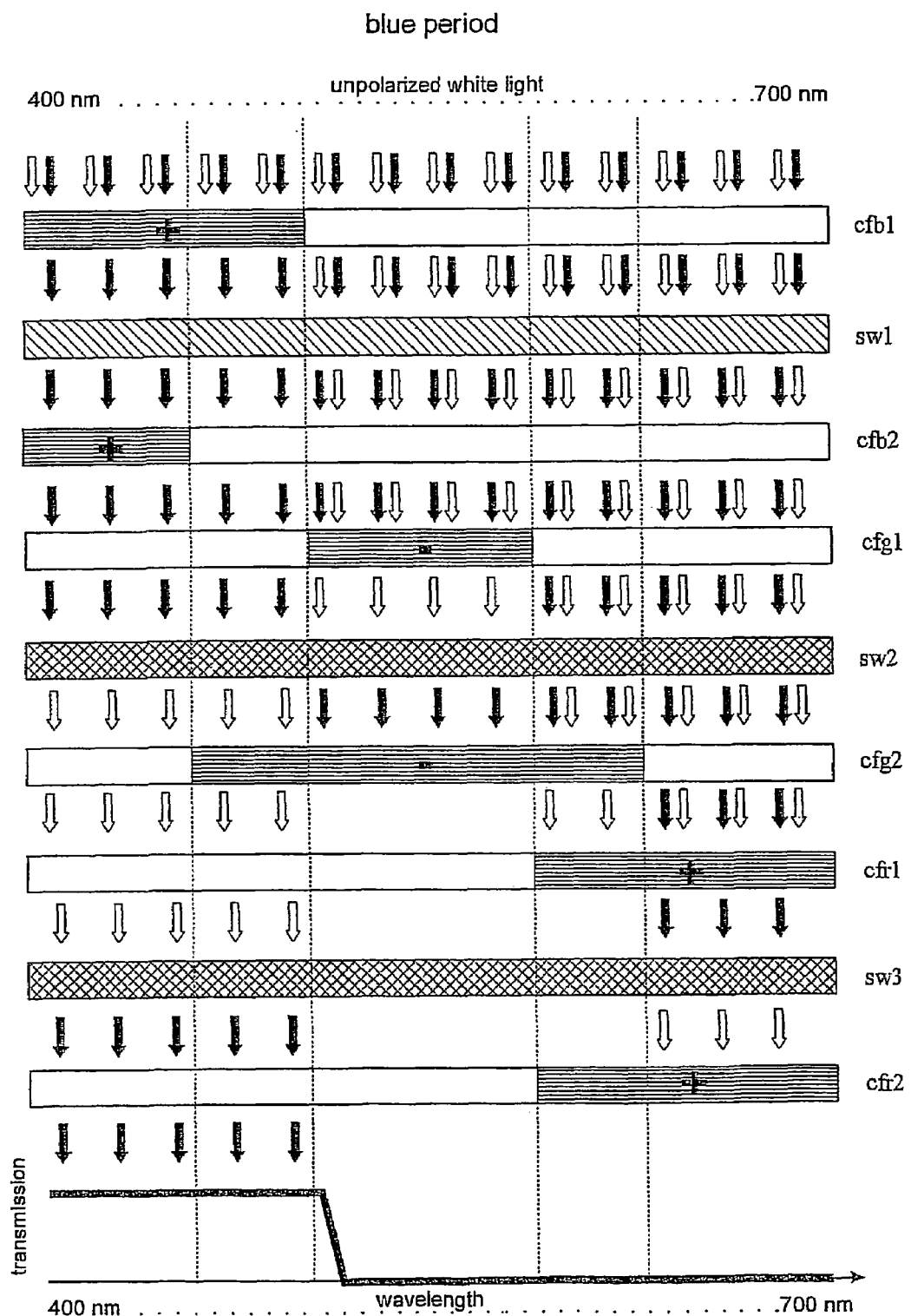

A second embodiment of the invention is schematically illustrated in FIGS. 6a, 6b and 6c. It uses the advantageous possibility of choosing the filter characteristics such that for the cholesteric filters overlapping wavelength bands are possible. As discussed above, this is important if the light of the lamp should be used efficiently.

The meanings of the arrows and other symbols in FIGS. 6a, 6b and 6c correspond to those in FIG. 5.

Compared to the embodiment of FIG. 5, the embodiment of FIG. 6 has two relevant changes: In the red part, the long-wavelength cutoff of the green filter is at a longer wavelength than the short-wavelength cutoff of the red filter, i.e. the blocking ranges overlap, with the desired result that a defined wavelength band can be blocked completely. Whereas this feature is also possible with the known concept of independent BMFs, the green/blue boundary, however, is different. The two blue as well as the two green cholesteric filters have different selective reflection bands. Using the same reasoning as in the discussion of FIG. 5, one finds from FIG. 6a that the long-wavelength cut-off of the cholesteric filter cfb1 together with the short-wavelength cutoff of the cholesteric filter cfg1 determine the long-wavelength cutoff of the transmitted blue light. Further, from FIG. 6b one finds that the long-wavelength cutoff of the cholesteric filter cfb2 together with the short-wavelength cut-off of the cholesteric filter cfg2 determine the short-wavelength cutoff of the transmitted blue light. Since these cutoff-wavelengths can be freely chosen, advantageously any desired band-pass characteristics can be implemented.

The design concepts described above with reference to FIGS. 5 and 6 are useful and result in switchable color filters of quite good quality. However, the implicit assumption that all switches are $\lambda/2$-plates for all wavelengths is certainly only approximately true. As a further improvement of a liquid crystal switchable color filter according to the invention, it is therefore proposed to optimize the relative arrangements of the components. To find such an arrangement, for instance an optimizing algorithm can be used.

In a successful example, an algorithm was used, which consists of a routine that calculates the transmission spectra of a given configuration and determines from these data a cost function that is a measure of the quality of the configuration. The cost function is minimal if both, color saturation and brightness are maximized. An optimization routine then varies the original configuration until a minimum is reached for the cost function. The algorithm is described in more detail below.

Figure 7:
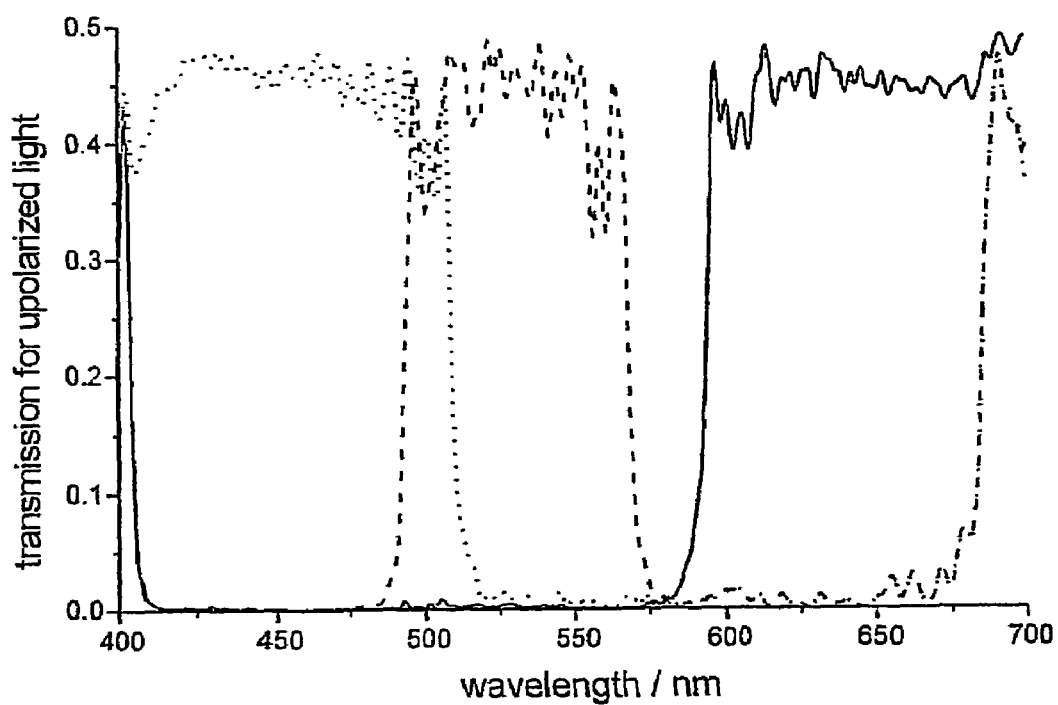
FIG. 7 is a graph showing transmissivities for the three color bands of a preferred embodiment.
Figure 13:
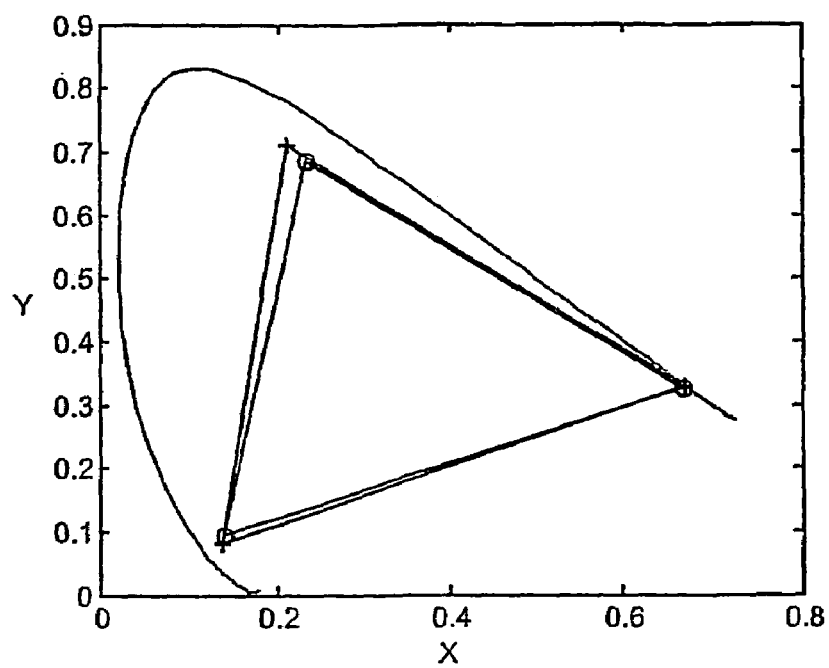
FIG. 13 is a chromaticity diagram showing the approximations provided by the preferred embodiment, to an NTSC TV system.

FIG. 7 shows the result of such an optimization, and FIG. 13 gives the corresponding chromaticity diagram. The excellent brightness and the almost perfect color saturation are evident from these data. Since the cut-off wavelengths of the cholesteric filters were part of the optimization procedure, these data again illustrate the importance of the overlap of the blue and the green spectral range.

Figure 8:
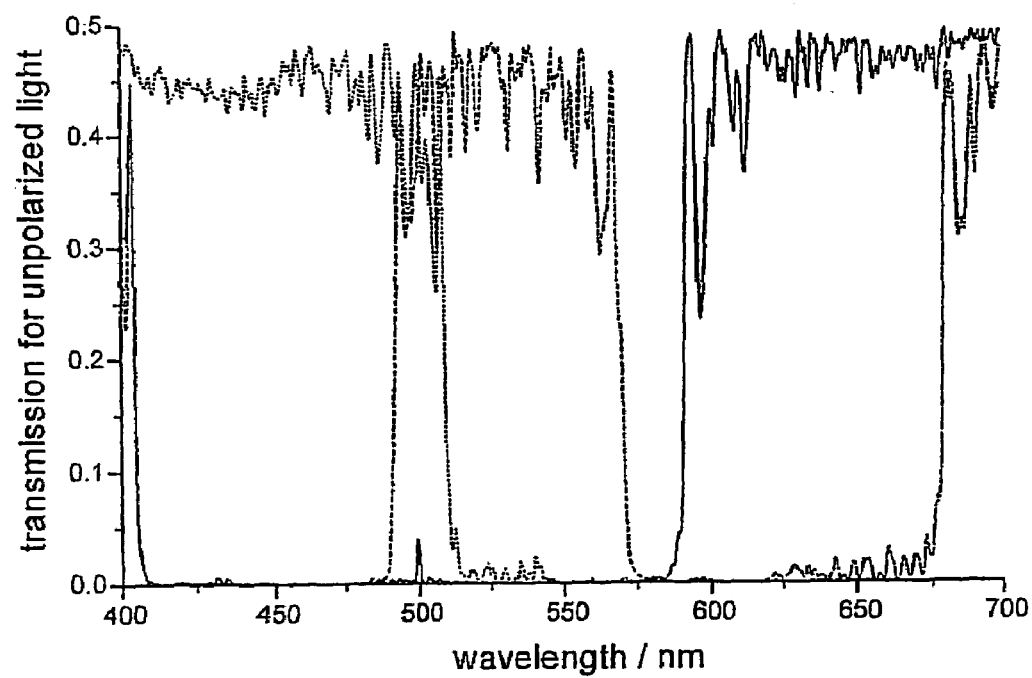
FIG. 8 shows transmissivities for the embodiment of FIG. 7, but with an additional output retarder/polarizer combination.

The results shown in FIG. 7 use unpolarized input light, no additional retarder and no 'cleaning' polarizer at the output (cf. also Table II). FIG. 8 shows the result for the same stack but with an additional output retarder/polarizer combination; it exhibits similar intensity as without polarizer, that is, the output light is already well polarized by the cholesteric filters alone. This can also be seen from FIG. 9, where the output polarizer was rotated by 90°. These spectra are quite weak, a direct indication of a high degree of polarization. However, the signal of the wrong polarization is strong enough to possibly reduce the performance of the subsequent imager, so the cleaning polarizer may be necessary. In addition, the same imperfections (i.e. $\Delta$nd-variations) that degrade the performance of the known independent serial BMFs in their off state will in the present case degrade the polarization quality of our color switch in its on state. However, a degradation of the polarization quality in the on state is much less harmful; it leads to an additional reduction of brightness of 3 to 5%, which is acceptable in view of the high overall brightness of the color switch.

Figure 11:
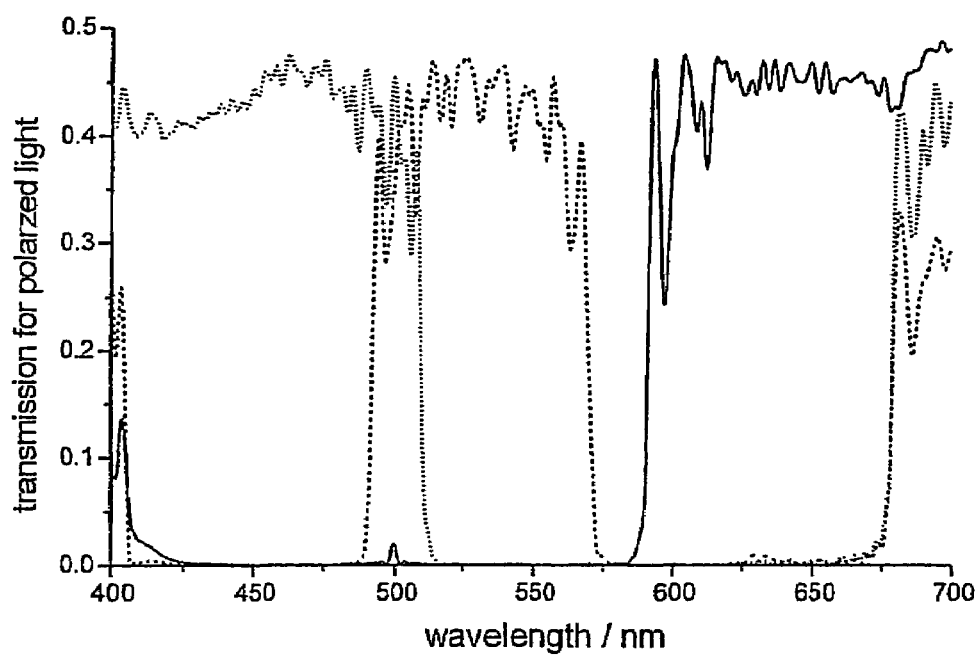
FIG. 11 is a graph showing transmissivities for a further embodiment of the invention, which is adapted to already linearly polarized input light.
Figure 14:
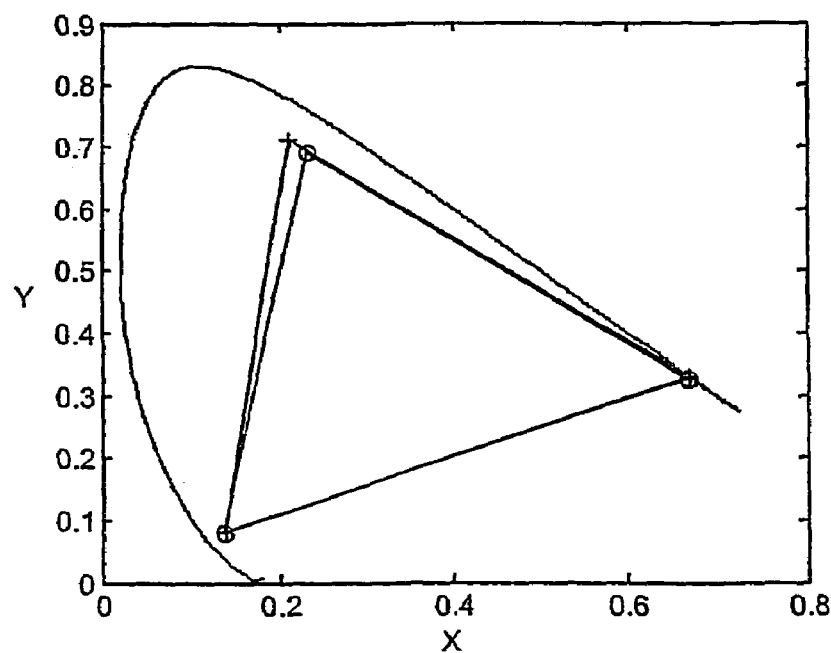
FIG. 14 is a chromaticity diagram corresponding to the transmissivities shown in FIG. 11.

In a variation of the invention, the liquid crystal switchable color filter can also be adapted for input light that is already linearly polarized, as is for instance the case if a polarization recycling scheme is used to illuminate the switchable color filter. In fact, the liquid crystal switchable color filter may be simplified in this case: the first cholesteric filter as well as the first λ/4-plate can be omitted. FIG. 11 shows an example of corresponding spectra. They are equally bright and saturated as the former spectra (see also the corresponding chromaticity diagram in FIG. 14).

Figure 1:
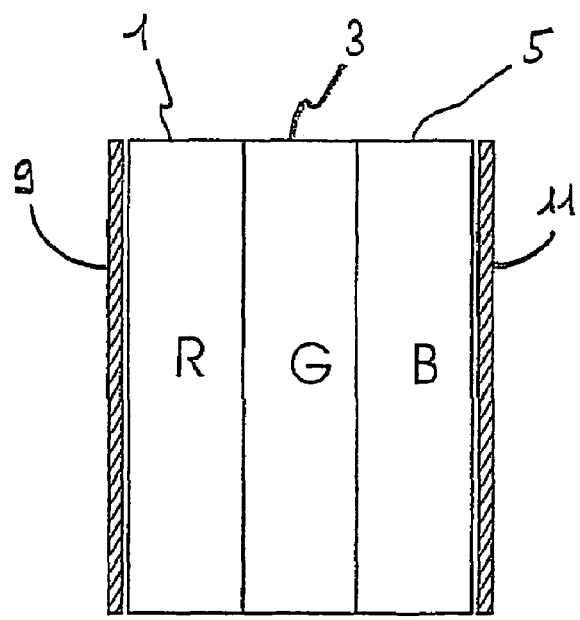
FIG. 1 is a sketch showing the general structure of a known color switch.
Figure 2:
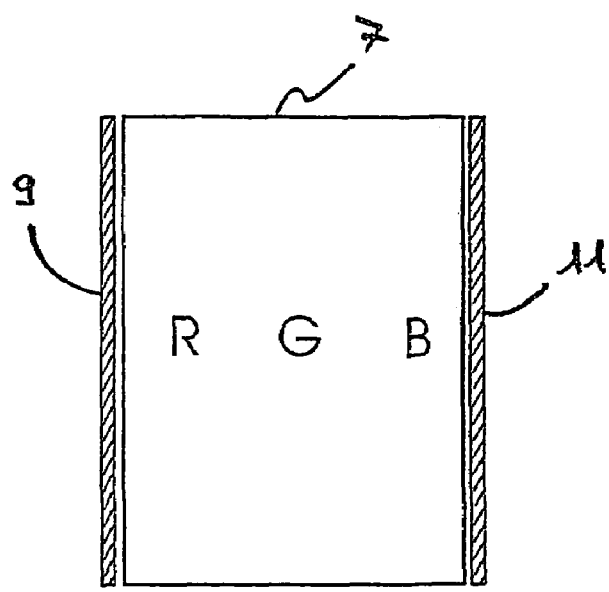
FIG. 2 is a sketch illustrating the concept of 'fused' BMFs in comparison to the independent BMFs of FIG. 1.
Figure 3:
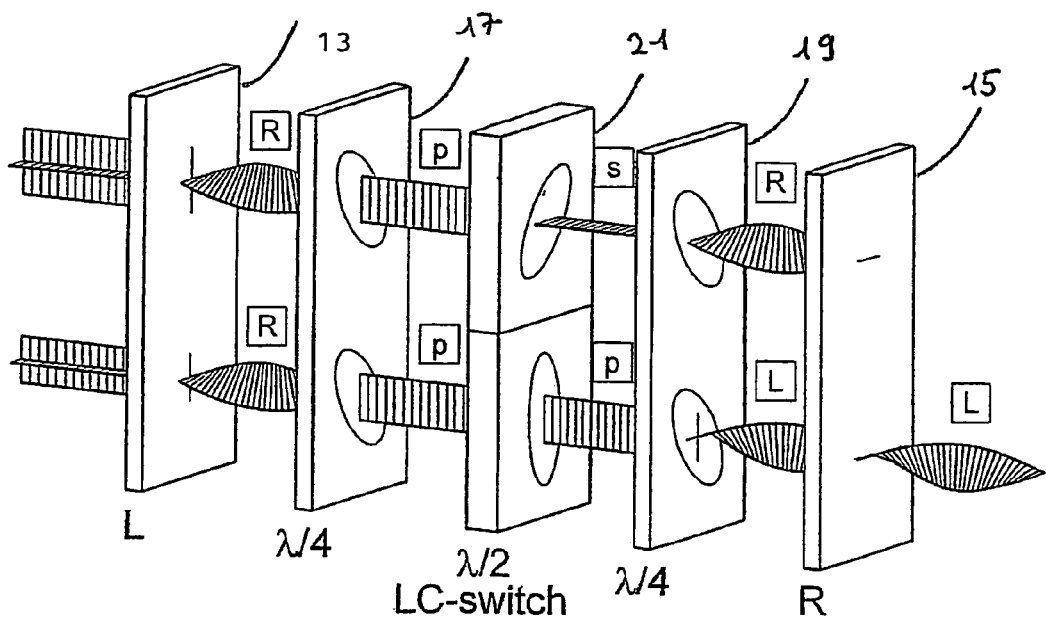
FIG. 3 is a schematic representation of a known band modulation filter.
Figure 4:
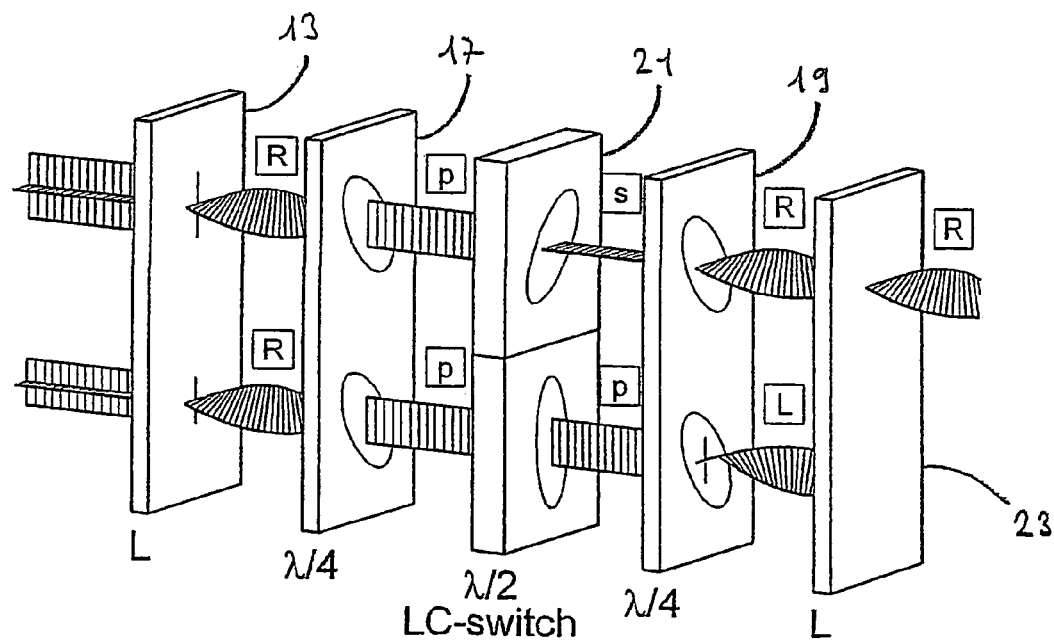
FIG. 4 illustrates a 'cholesteric filter $\lambda$/4-plate/LC switch/$\lambda$/4-plate/cholesteric filter' configuration according to the invention.
Figure 15:
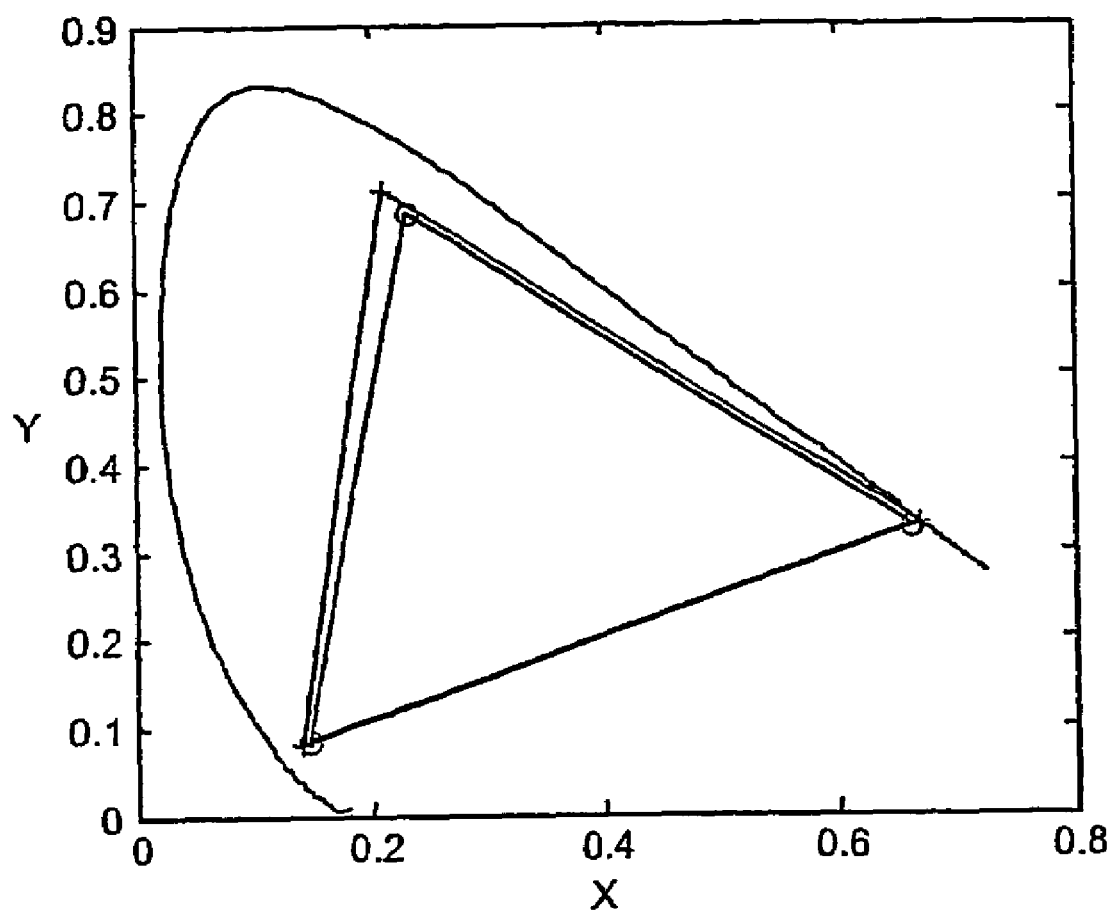
FIG. 15 is a chromaticity diagram corresponding to the transmissivities shown in FIG. 12.

Similarly, in a further variation of the invention, the last cholesteric filter can be omitted if on the light output side a polarizer is used that can handle the full light intensity (for high intensities e.g. a polarizing beam splitter). From FIGS. 5 and 6 it can be seen that the last cholesteric filter cfr2 serves to block one red circular polarization. Further, from FIG. 4 showing schematically the principal components of a filter section it can be seen that the needed blocking action can also be achieved by a linear polarizer just after the LC-switch. Thus, the handling of the red spectral range is not changed if the cholesteric filter cfr2 together with the λ/4-wave plate are replaced by a linear polarizer. To improve the quality of this embodiment, it is however advantageous to make sure that at the same time the remaining spectral ranges (green and blue) are absorbed by the linear polarizer as little as possible. One way to reach this goal is the optimization of the parameters of the remaining components, and the spectra shown in FIG. 12 as well as the chromaticity diagram of FIG. 15 show that in this way indeed a satisfactory color switch can be designed.

For the calculations in the examples given, the following conditions have been used: The color filters are composed of polarizers, retarders, cholesteric filters and liquid crystal switches. The calculations use a 4×4-matrix formalism. Retarders, cholesteric filters and—if present—SSF LC cells use the same model for the birefringence n, namely $n(\lambda) = n_0 + n_1\lambda^2/(\lambda^2 - \lambda_0^2)$, using the parameters given in Table I for the retarders. For DHF LC cells the birefringence is different in the two switching states and taken as 1.098 $\Delta n_{DEF}$ and 1.513 $\Delta n_{DHF}$, where $\Delta n_{DEF}$ is given by the parameters also shown in Table I. These data have been determined from real liquid crystal mixtures. Antireflection coatings are applied to the front and the back surface, modeled as a linear decrease of the isotropic refractive index n from the average index of the retarder material to n=1. Glass- and ITO-layers are neglected.

TABLE I

| parameter | $n_0$ | $n_1$ | $\lambda_0$ |
|---|---|---|---|
| retarder $n_o$ | 1.205 | 0.324 | 170.9 |
| retarder $n_e$ | 1.368 | 0.262 | 221.2 |
| DHF $n_o$ | 1.205 | 0.324 | 170.9 |
| DHF $n_e$ | 1.417 | 0.174 | 246.7 |

In the optimization routine the following cost function G is minimized: Calculate the tristimulus-responses ($X_F$, $Y_F$, $Z_F$, $x_F$, $y_F$) for all three colors F=R, G, B, assuming a white (equal energy per nm bandwidth) light source. In a real application, advantageously the spectrum of the actual light source of the projection system should be used. With the data calculate $$G = \sum_{F=R,G,B} g_{1F}((x_F - x_{F0})^2 + (y_F - y_{F0})^2) + g_{2F}(Y_F - Y_{F0})^2$$

and minimise G by with respect to the above listed parameters. $x_{F0}$ and $y_{F0}$ denote the target values x,y for the colour coordinates (taken as the NTSC colour co-ordinates in our examples). The target values for the brightness, $Y_{F0}$ are determined from the brightness of an ideal colour filter. This ideal filter has a transmission of 1 in a given wavelength band and falls off to 0 over 10 nm on each side. The bandwidths of the filter are chosen as wide as possible while still retaining the desired colour saturation. Note that for a specific design the actual lamp spectrum has to be employed in this calculation. The resulting brightness of the three colours of these ideal filters is used as target values for the colour switch. In our case, the values are 0.12, 0.25 and 0.05 for F=R, G, B respectively. The values of $Y_F$ should be larger than, but close to, the maximum that can be attained for each colour. Note that the maximum transmission is 0.5 due to the polarizers. The weight parameters g are chosen interactively, adjusted recursively, such that the size of corresponding terms in G after the optimisation are similar (within a factor of ten, preferably three).

As described above, FIG. 7 to 12 show the calculated transmission spectra in the three switching states of several embodiments of a switchable color filter according to the invention. Tables II and III list the components involved and their parameters.

TABLE II

Parameters used in the calculations of the data shown in FIGS. 7 to 11

Figure 9:
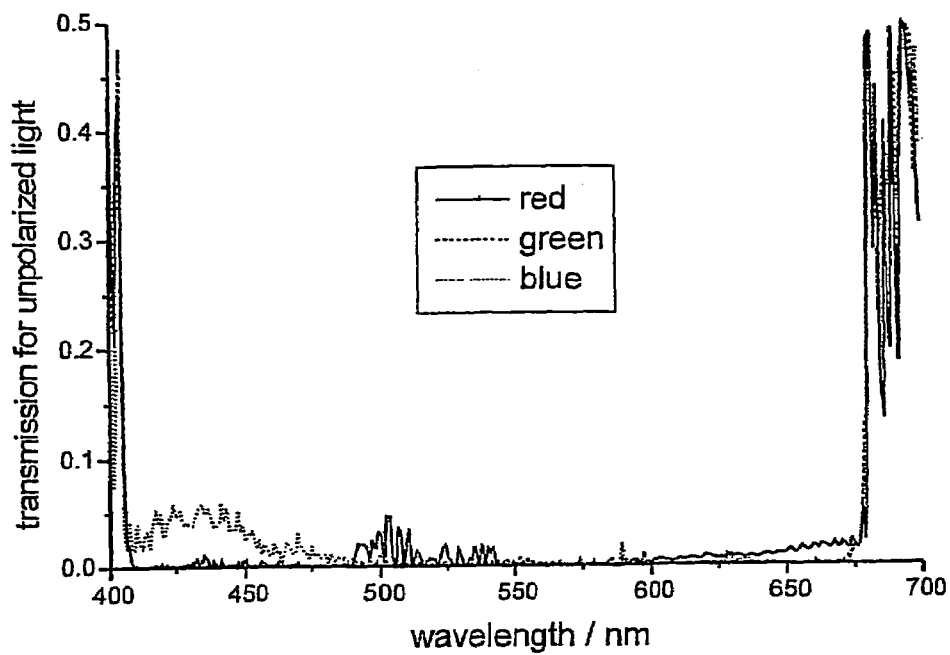
FIG. 9 is a graph showing transmissivities for the embodiment of FIG. 8, but with the output polarizer rotated by 90°.
Figure 10:
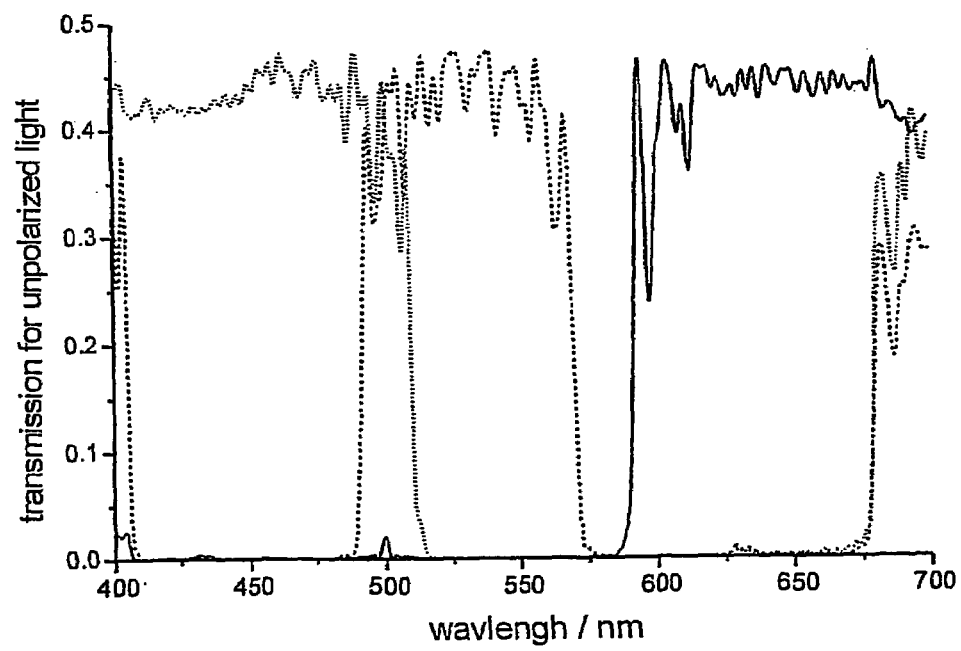
FIG. 10 shows transmissivities for an embodiment comprising an additional input retarder/polarizer combination.

| No | component | angle/° (retarders, LC cells) | center wavelength/nm (cholesteric filters) | thickness/ μm | FIG. 7 | FIG. 8 | FIG. 9 | FIG. 10 | FIG. 11 |
|---|---|---|---|---|---|---|---|---|---|
| 1 | polarizer | | | | | | | 74° | 123° |
| 2 | ret-in | 34 | | 0.97 | | | | X | |
| 3 | cfb1 | | 422; 445; 471; 498 | | X | X | X | X | |
| 4 | ret1.1 | −12 | | 0.942 | X | X | X | X | |
| 5 | swcell1 (DHF) | 107.5 | | 2.00 | X | X | X | X | X |
| 6 | ret1.2 | −12 | | 0.942 | X | X | X | X | |
| 7 | cfb2 | | 422; 450; 474 | | X | X | X | X | X |
| 8 | cfg1 | | −530; −560 | | X | X | X | X | X |
| 9 | ret2.1 | 75 | | 1.25 | X | X | X | X | X |
| 10 | swcell2 (DHF) | 195 | | 2.40 | X | X | X | X | X |
| 11 | ret2.2 | 75 | | 1.25 | X | X | X | X | X |
| 12 | cfg2 | | −484; −517; −551; −570 | | X | X | X | X | X |
| 13 | cfr1 | | 591; 630; 660 | | X | X | X | X | X |

TABLE II-continued

Parameters used in the calculations of the data shown in FIGS. 7 to 11

| No | component | angle/° (retarders, LC cells) | center wavelength/nm (cholesteric filters) | thickness/ μm | FIG. 7 | FIG. 8 | FIG. 9 | FIG. 10 | FIG. 11 |
|---|---|---|---|---|---|---|---|---|---|
| 14 | ret3.1 | 35 | | 1.32 | X | X | X | X | X |
| 15 | swcell3 (DHF) | 155 | | 2.90 | X | X | X | X | X |
| 16 | ret3.2 | 35 | | 1.32 | X | X | X | X | X |
| 17 | cfr2 | | 630; 660 | | X | X | X | X | X |
| 18 | ret-out | 81 | | 1.21 | X | X | X | X | X |
| 19 | polarizer | | | | | 39° | 129° | 39° | 39° |

TABLE III

Figure 12:
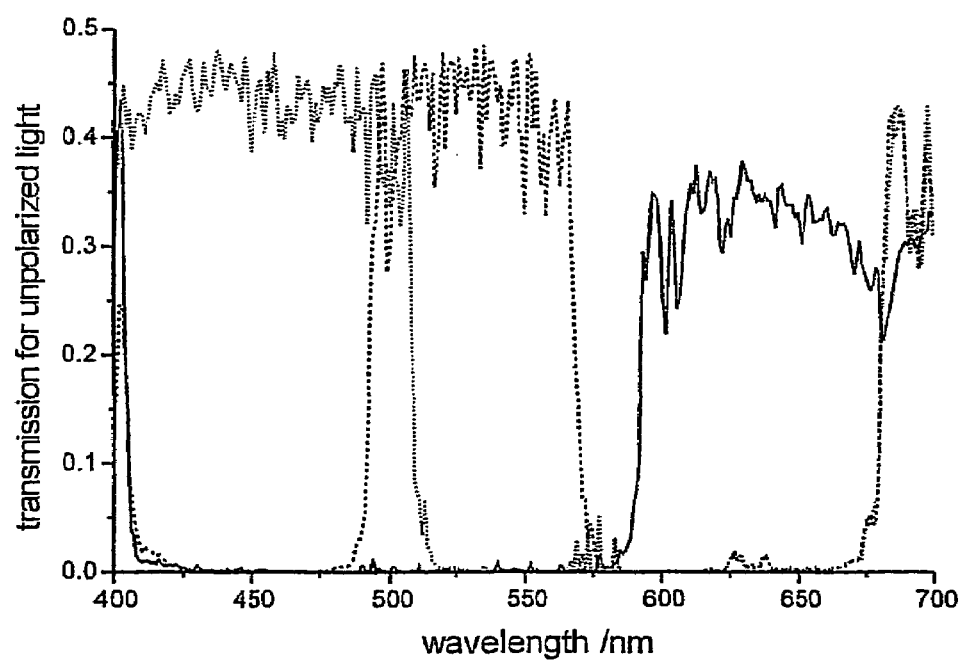
FIG. 12 is a graph showing transmissivities for still a further embodiment of the invention.

Parameters used in the calculations of the data shown in FIG. 12

| No | component | angle/° (retarders, LC cells) | center wavelength/nm (cholesteric filters) | thickness/ μm |
|---|---|---|---|---|
| 1 | polarizer | 0 | | |
| 2 | swcell1 (DHF) | −15 | | 2.00 |
| 3 | ret1.2 | −135 | | 0.93 |
| 4 | cfb2 | | 422; 450; 474 | |
| 5 | cfg1 | | −530; −560 | |
| 6 | ret2.1 | 96 | | 1.28 |
| 7 | swcell2 (DHF) | 216 | | 2.88 |
| 8 | ret2.2 | 75 | | 1.28 |
| 9 | cfg2 | | −484; −517; −545; −570 | |
| 10 | cfr1 | | 592; 610; 655 | |
| 11 | ret3.1 | 111 | | 0.47 |
| 12 | swcell3 (DHF) | 231 | | 2.08 |
| 13 | polarizer | 306 | | |

In the tables, angles are given with respect to an arbitrary laboratory-frame axis; the sign of the center wavelength indicates the handedness; more than one number given in the center wavelength column indicates that in order to get the desired bandwidth, several cholesteric filters were used in series (because the birefringence of the nematic host material used was smaller than required for getting the needed bandwidths with only one cholesteric filter), and the numbers given are the center wavelength of the selective reflection bands of these sublayers; an 'x' means that this component is present; and a number in a polarizer row indicates the angle of the polarizer axis, no number means no polarizer is used at that position in the stack.

The invention claimed is:

1. A liquid crystal switchable color filter for switching between a first, a second and a third color band, with a light path including a light input side and a light output side, the color filter comprising:
    a first switchable liquid crystal cell capable of at least two switching states;
    a first retarder layer which acts for the first color band as a quarter-wave plate;
    a first cholesteric filter including a selective reflection band for the first color band;
    a second cholesteric filter including a selective reflection band for the second color band;
    a second retarder layer which acts for the second color band as a quarter-wave plate;
    a second switchable liquid crystal cell capable of at least two switching states;
    a third retarder layer which acts for the second color band as a quarter-wave plate;
    a third cholesteric filter including a selective reflection band for the second color band;
    a fourth cholesteric filter including a selective reflection band for the third color band;
    a fourth retarder layer which acts for the third color band as a quarter-wave plate;
    a third switchable liquid crystal cell capable of at least two switching states; and
    a polarization blocking element;
    wherein the handedness of the second cholesteric filter is equal to the handedness of the third cholesteric filter and opposite to the handedness of the first and fourth cholesteric filter; and
    wherein, for the blocking state of the respective color band the optic axis of the corresponding switchable liquid crystal cell is either substantially parallel or substantially perpendicular to the light polarization direction.

2. A liquid crystal switchable color filter according to claim 1, wherein the polarization blocking element is formed by a linear polarizer.

3. A liquid crystal switchable color filter according to claim 1, wherein the polarization blocking element is formed by a fifth retarder layer which acts for the third color band as a quarter-wave plate and a fifth cholesteric filter including a selective reflection band for the third color band.

4. A liquid crystal switchable color filter according to claim 1, which comprises, added on the light input side, a supplementary cholesteric filter inclluding a selective reflection band for the first color band and a supplementary retarder layer which acts for the first color band as a quarter-wave plate.

5. A liquid crystal switchable color filter according to any of claims 1–4, wherein the cutoff wavelengths of the selective reflection band of the cholesteric filters are chosen such that at least two of the first, second and third color bands overlap in its transmissive state.

6. A liquid crystal switchable color filter according to claim 1, wherein the short-wavelength cutoff of the second cholesteric filter is different from the short-wavelength cutoff of the third cholesteric filter.

7. A liquid crystal switchable color filter according to claim 1, wherein the long-wavelength cutoff of the first cholesteric filter and the short-wavelength cutoff of the third cholesteric filter are at a substantially equal wavelength, which is shorter than the short-wavelength cutoff of the second cholesteric filter.

8. A liquid crystal switchable color filter according to claim 1, wherein the long-wavelength cutoff of the second cholesteric filter is different from the longwavelength cutoff of the third cholesteric filter.

9. A liquid crystal switchable color filter according to claim 1, wherein the long-wavelength cutoff of the third cholesteric filter is at a longer wavelength than the short-wavelength cutoff of the fourth cholesteric filter.

10. A liquid crystal switchable color filter according to claim 1, wherein at least one of the switchable liquid crystal cells is of a Deformed Helix Ferroelectric (DHF) type or of a Surface Stabilized Ferroelectric (SSF) type.

11. A liquid crystal switchable color filter according to claim 1, wherein at least one of the switchable liquid crystal cells is of a anti-ferroelectric type or especially of a thresholdiess anti-ferroelectric type.

12. A liquid crystal switchable color filter according to claim 1, wherein at least one of the switchable liquid crystal cells is of an electroclinic type.

13. A liquid crystal switchable color filter according to claim 1, which comprises on the light output side an additional cleaning polarizer.

14. A time-sequential color device containing a liquid crystal switchable color filter according to claim 1.

15. An optical projection device containing a liquid crystal switchable color filter according to claim 1.

16. A direct view display containing a liquid crystal switchable color filter according to claim 1.

17. A video camera containing a liquid crystal switchable color filter according to claim 1.

* * * * *